(12) United States Patent
Nishikubo et al.

(10) Patent No.: US 10,802,917 B2
(45) Date of Patent: Oct. 13, 2020

(54) MEMORY SYSTEM CONFIRMING WHETHER PROCESSING OF PRESERVING DATA WHICH HAS BEEN BEFORE SHUTDOWN

(71) Applicant: Toshiba Memory Corporation, Minato-ku (JP)

(72) Inventors: Ryuji Nishikubo, Kawasaki (JP); Jun Kano, Shizuoka (JP)

(73) Assignee: Toshiba Memory Corporation, Minato-ku (JP)

( * ) Notice: Subject to any disclaimer, the term of this patent is extended or adjusted under 35 U.S.C. 154(b) by 125 days.

(21) Appl. No.: 16/129,315

(22) Filed: Sep. 12, 2018

(65) Prior Publication Data

US 2019/0310917 A1 Oct. 10, 2019

(30) Foreign Application Priority Data

Apr. 9, 2018 (JP) .................................. 2018-074821

(51) Int. Cl.
*G06F 11/14* (2006.01)
*G06F 1/30* (2006.01)
*G06F 11/20* (2006.01)

(52) U.S. Cl.
CPC ............ *G06F 11/1441* (2013.01); *G06F 1/30* (2013.01); *G06F 11/2094* (2013.01)

(58) Field of Classification Search
CPC ............ G06F 11/1417; G06F 11/1438; G06F 11/1441; G06F 11/2053; G06F 11/2094; G06F 9/4401; G06F 9/4403; G06F 9/442; G06F 1/30
See application file for complete search history.

(56) References Cited

U.S. PATENT DOCUMENTS

| 5,109,505 A | * | 4/1992 | Kihara | ................ G06F 11/1441 365/228 |
| 9,880,928 B1 | * | 1/2018 | Bono | ................ G06F 12/0246 |
| 2010/0037009 A1 | * | 2/2010 | Yano | ................ G06F 12/0246 711/103 |
| 2011/0173380 A1 | | 7/2011 | Yano et al. | |
| 2012/0159244 A1 | | 6/2012 | Hirao et al. | |
| 2014/0173190 A1 | | 6/2014 | Trika | |
| 2015/0082099 A1 | | 3/2015 | Meir et al. | |
| 2015/0186224 A1 | * | 7/2015 | Lin | ................ G06F 11/1435 714/6.12 |

(Continued)

FOREIGN PATENT DOCUMENTS

| JP | 2010-157139 | 7/2010 |
| JP | 2012-128643 | 7/2012 |

*Primary Examiner* — Gabriel Chu
(74) *Attorney, Agent, or Firm* — Oblon, McClelland, Maier & Neustadt, L.L.P.

(57) ABSTRACT

According to one embodiment, a memory system includes a nonvolatile memory having a first writing area and a second writing area, and a controller, in which the controller confirms whether processing of preserving data which has been written before shutdown which is not going through a predetermined shutdown procedure is being executed, in the nonvolatile memory, when the controller receives a write command, causes the nonvolatile memory to write data to the first writing area if the processing is not being executed, and causes the nonvolatile memory to write data to the second writing area if the processing is being executed.

16 Claims, 4 Drawing Sheets

(56) References Cited

U.S. PATENT DOCUMENTS

2016/0139832 A1 5/2016 Zettsu
2018/0336104 A1* 11/2018 Koo .................... G06F 11/1417
2019/0377641 A1* 12/2019 Hong .................... G11C 16/10

* cited by examiner

MEMORY SYSTEM CONFIRMING WHETHER PROCESSING OF PRESERVING DATA WHICH HAS BEEN BEFORE SHUTDOWN

CROSS-REFERENCE TO RELATED APPLICATIONS

This application is based upon and claims the benefit of priority from Japanese Patent Application No. 2018-074821, filed on Apr. 9, 2018; the entire contents of which are incorporated herein by reference.

FIELD

Embodiments of the present invention relate generally to a memory system and a method of controlling a memory system.

BACKGROUND

In recent years, the capacity of a nonvolatile memory has been increased, and a solid state drive (SSD) has attracted attention as a memory system equipped with the nonvolatile memory.

When an improper shutdown occurs, the memory system moves data of a block being written in start processing after the improper shutdown. Meanwhile, writing to the nonvolatile memory is prohibited. This raises a problem of extending the startup processing time of the memory system.

DETAILED DESCRIPTION

A memory system according to an embodiment includes a nonvolatile memory having a first writing area and a second writing area, and a controller, in which the controller confirms whether processing of preserving data which has been written before shutdown which is not going through a predetermined shutdown procedure is being executed, in the nonvolatile memory, when the controller receives a write command, causes the nonvolatile memory to write data to the first writing area if the processing is not being executed, and causes the nonvolatile memory to write data to the second writing area if the processing is being executed.

Hereinafter, the present invention will be described in detail with reference to the drawings. Note that the present invention is not limited by the following embodiment. Further, constituent elements in the following embodiment include those easily assumed by those skilled in the art or those substantially the same.

A memory system and processing of controlling a memory system according to the embodiment will be described with reference to FIGS. 1 to 5.

[Configuration Example of Memory System]

Figure 1:
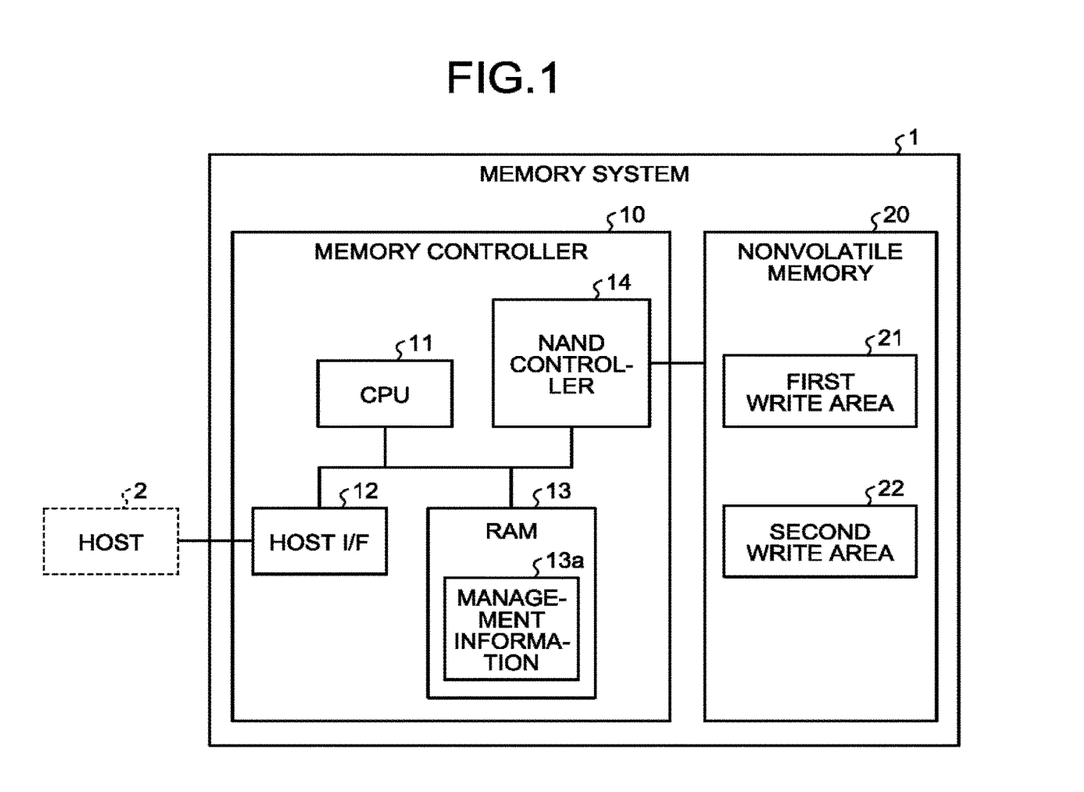
FIG. 1 is a diagram showing a configuration example of a memory system according to an embodiment.

FIG. 1 is a diagram showing a configuration example of a memory system 1 according to an embodiment. As shown in FIG. 1, the memory system 1 includes a nonvolatile memory 20 as a nonvolatile semiconductor memory having a first writing area 21 and a second writing area 22, and a memory controller 10. Details of the memory system 1 will be described below.

The memory system 1 is connected to a host 2 by a predetermined communication interface. The host 2 is, for example, a personal computer, a portable information terminal, or a server. The memory system 1 can receive an access command from the host 2. The access command is a read command, a write command, a flash command, and the like. The flash command is a command for which the nonvolatile memory 20 forcibly completes delayed writing of data. Each access command includes a logical address indicating an access destination. The logical address indicates a location within a logical address space in which the memory system 1 provides to the host 2. The memory system 1 accepts, for example, data to be written together with a write command.

Note that the memory system 1 can include an arbitrary nonvolatile semiconductor memory as the nonvolatile memory 20. For example, the memory system 1 can include a NAND-type flash memory or a NOR-type flash memory as the nonvolatile memory 20.

The nonvolatile memory 20 has the first writing area 21 and the second writing area 22. The first writing area 21 is configured by a block group that can be processed in parallel. The second writing area 22 is configured by another block group that can be processed in parallel. Further, the second writing area 22 is favorably formed of a block group having a smaller size than the block group of the first writing area 21.

The memory controller 10 is a circuit that execute: data transfer between the host 2 and the nonvolatile memory 20. The memory controller 10 determines whether this start is restarting after improper shutdown, that is, whether previous shutdown is the improper shutdown, when restarting the memory system 1. The improper shutdown means that supply of the power to the memory system 1 is cut off without a predetermined end command issued from the host 2.

Further, in the case where the restarting is after improper shutdown, the memory controller 10 causes the nonvolatile memory 20 to perform cleanup (data preservation processing) of a block that is a block being written by the nonvolatile memory 20 at the time of improper shutdown. The cleanup (data preservation processing) is to move data within one writing area. Data being written to a certain block at the time of improper shutdown may be damaged. Therefore, to preserve undamaged other data in the block, the other data is moved to another block.

When the nonvolatile memory 20 performs cleanup for one writing area, the memory controller 10 cannot cause the nonvolatile memory 20 to process the access commands as the write command and the flash command for the writing area. Therefore, when the nonvolatile memory 20 is performing the cleanup of the first writing area 21, the memory controller 10 causes the nonvolatile memory 20 to process the access commands for the second writing area 22.

The memory controller 10 includes a central processing unit (CPU) 11, a host interface (host I/F) 12, a random access memory (RAM) 13, and a NAND controller 14.

The CPU 11 executes control of other functional units included in the memory controller 10 based on a firmware program. The firmware program is stored in advance in a nonvolatile semiconductor memory such as the nonvolatile memory 20, for example, and is read at the time of start and executed by the CPU 11.

When writing data to be written received from the host 2 into the nonvolatile memory 20, the CPU 11 determines a writing area of the data from a free area of the nonvolatile memory 20, and specifies a physical storage location. The physical storage location is represented by a physical address. The free area is an area where none of data is stored and is an area where new data can be written. The CPU 11 maps the physical storage location of the determined writing area to a logical address indicating the location of the data.

The RAM 13 is a memory that provides a temporary storage area. The type of the memory constituting the RAM 13 is not limited to a specific type. For example, the RAM 13 is configured by a dynamic random access memory (DRAM), a static random access memory (SRAM), or a combination thereof. The RAM 13 stores management information 13a. The management information 13a is master information that is management information stored in the nonvolatile memory 20 and expanded at the time of start processing or the like. The management information 13a is information for associating the logical address designated by the host and a physical storage location of the data.

The host interface 12 is a communication interface between the memory controller 10 and the host 2. The host interface 12 executes data transfer between the host 2 and the RAM 13 under the control of the CPU 11.

The NAND controller 14 executes data transfer between the nonvolatile memory 20 and the RAM 13 under the control of the CPU 11. That is, data transfer between the host 2 and the nonvolatile memory 20 is executed via the RAM 13 under the control of the CPU 11.

[Configuration Examples of First and Second Writing Areas]

Figure 2:
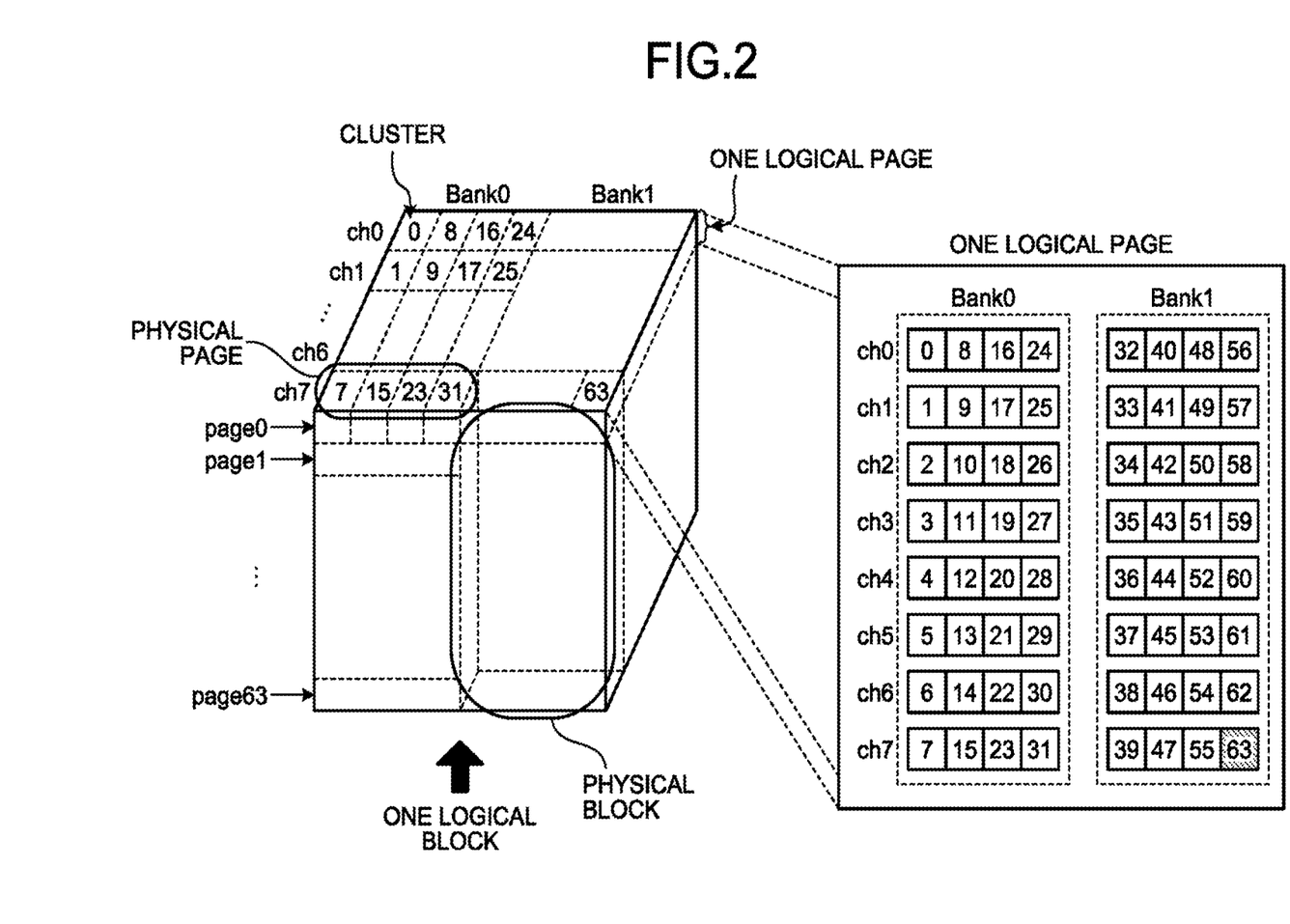
FIG. 2 is a diagram showing a configuration example of a first writing area of a nonvolatile memory according to the embodiment.

Next, configuration examples of the first writing area 21 and the second writing area 22 of the nonvolatile memory 20 will be described with reference to FIGS. 2 and 3. FIG. 2 is a diagram showing a configuration example of the first writing area 21 in the nonvolatile memory 20 according to the embodiment.

As shown in FIG. 2, the block group belonging to the first writing area 21 forms one logical block.

Specifically, each block (physical block) included is the block group is a minimum storage area in which data erasing can be executed, for example. The block includes a plurality of pages. The page is a minimum storage area in which data reading or data writing can be executed, for example.

A physical address is assigned to a unit smaller than one page at each block. The unit smaller than one page is called cluster. The sire of one cluster may be equal to or different from that of a minimum access unit from the host 2. In FIG. 2, for example, one page comprises four clusters.

The block group including the blocks forms one logical block. Data stored in the blocks forming the logical block is collectively erased. In FIG. 2, for example, sixteen blocks that can roughly collectively erase the data stored therein form one logical block.

A plurality of pages (physical pages) included in the block included in the block group belonging to the first writing area 21 forms logical page(s). One logical page consists of the pages having the same page number of each block out of the blocks forming the logical block. Data reading or data writing is executed in parallel for the pages forming the logical page. In FIG. 2, for example, sixteen pages that can roughly collectively read or write the data stored therein form one logical page.

Erasing data of the blocks in parallel, and reading and writing data of the pages in parallel as described above can be performed with the following configuration.

That is, channels are provided between the block group belonging to the first writing area 21 and the NAND controller 14 respectively, and are configured to enable parallel operations within the block group. In FIG. 2, for example, eight channels (ch0 to ch7) are provided and eight parallel operations can be performed. Further, a plurality of banks is provided in each channel, and is configured to enable parallel operations by bank interleaving. In FIG. 2, for example, two banks (Bank0 and Bank1) are provided and two parallel operations can be performed.

Further, each bank is divided into a plurality of planes. Each plane includes an independent peripheral circuit, and can perform erase/write/read at the same time, using a plane double speed mode. The peripheral circuit is, for example, a row decoder, a column decoder, a page buffer, or a data cache.

In this manner, the blocks of the block group belonging to the first writing area 21 can perform parallel operations by a plurality of channels, parallel operations by a plurality of banks, and parallel operations using a plurality of planes. As in FIG. 2, for example, in the case where the number of channels is eight, the number of banks is two, and the number of planes is two, a maximum of thirty two blocks can be operated in parallel.

Next, a configuration example of the second writing area 22 will be described with reference to FIG. 3.

Figure 3:
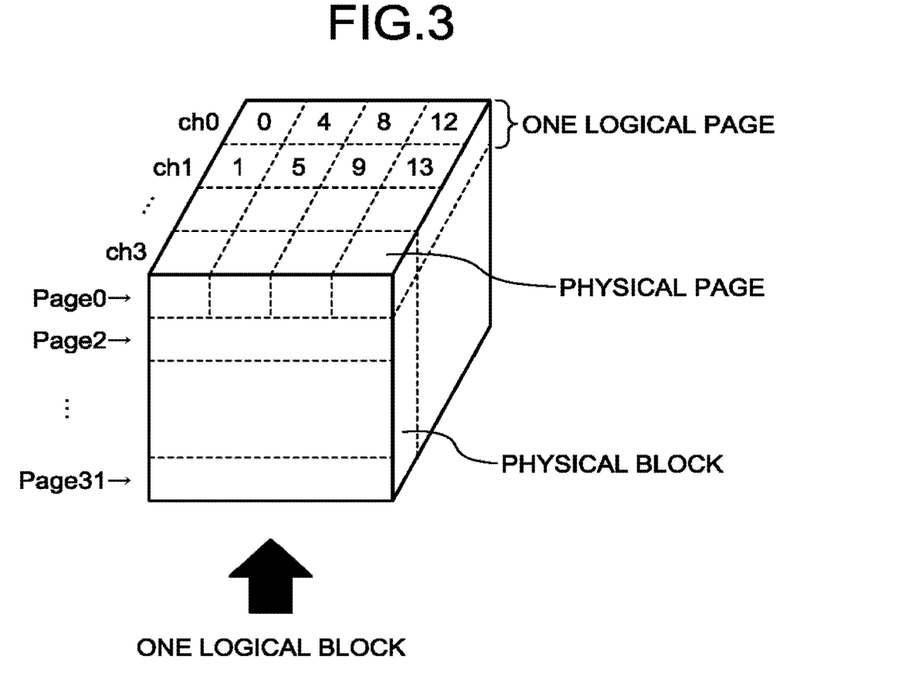
FIG. 3 is a diagram showing a configuration example of a second writing area of the nonvolatile memory according to the embodiment.

FIG. 3 is a diagram showing a configuration example of the second writing area 22 of the nonvolatile memory 20 according to the embodiment. The size of the second writing area 22 is favorably smaller than the size of the first writing area 21. The second writing area 22 favorably has a size in which cleanup in the second writing area 22 can end before cleanup in the first writing area 21 ends even if cleanup occurs in the second writing area 22 after improper shutdown.

Specifically, as shown in FIG. 3, the block group belonging to the second writing area 22 forms one logical block. In the second writing area 22, the number of channels, the number of banks, and the number of planes are favorably smaller than those of the first writing area 21, and the degree of parallelism of blocks is favorably reduced. With the configuration, the size of the block in the second writing area 22 can be made smaller than the size of the block in the first writing area 21.

Further, in the block belonging to the second writing area 22, a transistor of a single-level cell (SLC) capable of storing binary data is favorably used. Alternatively, a pseudo single-level cell (pSLC) transistor in which binary data is stored in a cell capable of storing multivalued data may be used. By these means, the size of the block in the second writing area 22 can be made smaller. In the block belonging to the first writing area 21, either type of transistor: SLC or multi-level cell (MLC) capable of storing multivalued data of three or more values may be used.

As described above, by configuring the size of the second writing area 22 to be sufficiently small, the cleanup in the second writing area 22 ends before the cleanup in the first writing area 21 ends even if cleanup occurs in the second writing area 22 after improper shutdown.

[Operation Example of Memory System]

Figure 4:
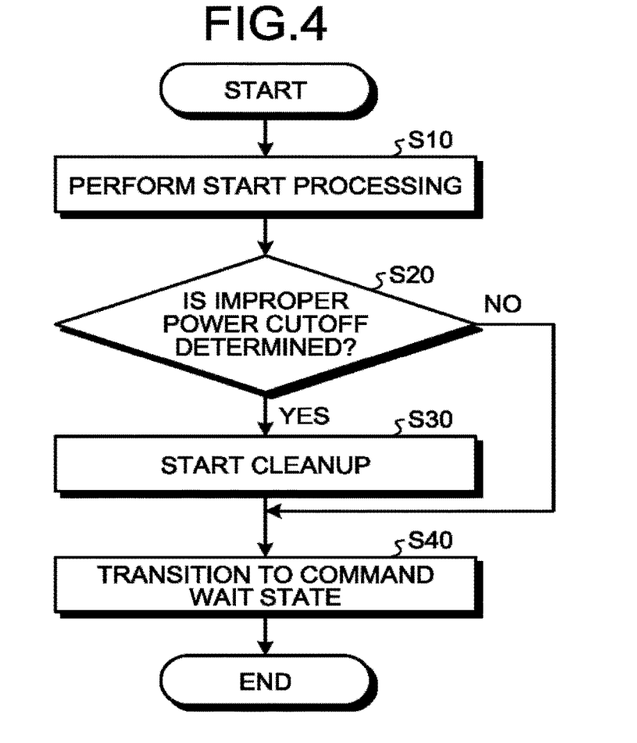
FIG. 4 is a flowchart slowing an example of an operation from start processing to transition to a command wait state of the memory system according to the embodiment.

Next, an example of a control operation in the memory system 1 will be described with reference to FIG. 4. FIG. 4 is a flowchart showing an example of an operation from start processing to transition to a command wait state of the memory system 1 according to the embodiment.

When the memory system 1 is started (start in FIG. 4), the memory system 1 performs start processing (step S10). In start processing, reading firmware program, caching management information stored in the nonvolatile memory 20, and the like are performed. The start processing is completed with completion of reading firmware program, caching management information, and the like. The memory controller 10 immediately transmits completion notification of start processing to the host 2 after completion of start processing. Alternatively, the memory controller 10 may transmit completion notification of start processing to the host 2 after a lapse of predetermined time since start processing is completed. Further, the memory controller 10 causes the nonvolatile memory 20 not to process the access command such as the write command and the flash command before transition to a command wait state (first mode). Here, the command wait state is a state before confirming that the cleanup is not being executed and is a state in which the access commands accepted by the memory system 1 are processable.

Further, the memory controller 10 determines whether this start is restarting after improper shutdown, that is, whether previous shutdown is the improper shutdown, after completion of start processing (step S20). More specifically, the memory controller 10 checks presence or absence of a flag indicating whether a predetermined shutdown procedure has been completed before shutdown.

As a result of determination in step S20, if not restarting after improper shutdown (No in step S20), the memory controller 10 immediately transitions to the command wait state (step S40) and ends the series of processing (end in FIG. 4).

As a result of determination in step S20, if restarting after improper shutdown (Yes in step S20), the memory controller 10 starts cleanup (step S30). After starting the cleanup, the memory controller 10 transitions to the command wait state without waiting for cleanup completion (step S40) and ends the series of processing (end in FIG. 4). That is, the memory controller 10 performs the cleanup in the background (background processing).

Figure 5:
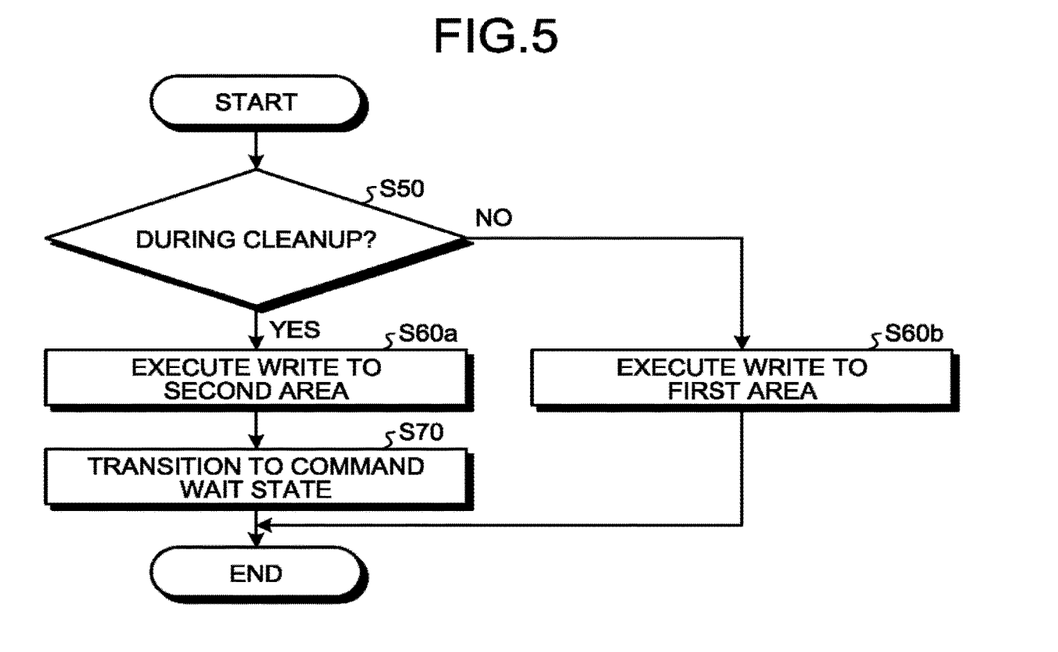
FIG. 5 is a flowchart showing an example of an access command processing operation of the memory system according to the embodiment.

Next, an operation in the command wait state of the memory system 1 will be described with reference to FIG. 5. FIG. 5 is a flowchart showing an example of an access command processing operation of the memory system 1 according to the embodiment.

When receiving the write command or the flash command in the command wait state (start in FIG. 5), the memory controller 10 determines whether the nonvolatile memory 20 is performing cleanup (executing cleanup) in the first writing area 21 (step S50).

If the cleanup is being executed in the first writing area 21 (Yes in step S50), the memory controller 10 causes the nonvolatile memory 20 to execute writing to the second writing area 22 (step S60a). The writing in step 360a is a write operation with a low degree of parallelism. Further, in writing to the second writing area 22 during the cleanup in the first writing area 21, throughput of the writing may be restricted. That is, in writing to the second writing area 22 during the cleanup in the first writing area 21, the memory controller 10 can cause the nonvolatile memory 20 to perform writing with a restricted processing speed (second mode). After completion of the writing in step S60a, the memory controller 10 immediately transitions to the command wait state (step S70) and ends the series of processing (end in FIG. 5).

If the cleanup is not being executed in the first writing area 21 (including a case where the cleanup has ended) (No in step S50), the memory controller 10 determines that the nonvolatile memory 20 is in normal operation. Then, the memory controller 10 causes the nonvolatile memory 20 to execute writing to the first writing area 21 (step S60b). That is, in writing to the first writing area 21 if the cleanup is not being executed in the first writing area 21 (including the case where the cleanup has ended), the memory controller 10 can cause the nonvolatile memory 20 to perform writing without restricting processing speed (third mode). The writing in step S60b is a write operation with a high degree of parallelism. After completion of the write operation in step S60b, the memory controller 10 ends the series of processing (end in FIG. 5).

When receiving the write command or the flash command after determining that the nonvolatile memory 20 is in normal operation, the memory controller 10 causes the nonvolatile memory 20 to process each access command for the first writing area 21. Further, the memory controller 10 sequentially moves data written in the second writing area 22 to the first writing area 21 after completion of the cleanup in the first writing area 21 (in the normal operation). With the movement, a space can be made in the second writing area 22, and thus the second writing area 22 can be used again when next improper shutdown occurs.

Comparative Example

In a memory system of a comparative example, a nonvolatile memory does not have a second writing area. Further, cleanup is performed as part of start processing, and during the cleanup, no access command to the nonvolatile memory is accepted. As a result of an increase in the capacity of the nonvolatile memory, lengthy start processing time due to cleanup rate control after improper shutdown becomes an issue in the memory system of the comparative example.

In the memory system 1 of the embodiment, the nonvolatile memory has two writing areas. Therefore, the memory system 1 can complete the start processing without waiting for cleanup, and cause the second writing area 22 to have the access command processed while performing the cleanup in the background. As a result, the start processing time after improper shutdown can be shortened. Further, the cleanup is performed as the background processing, the read command to the first writing area 21 can be accepted.

Further, the second writing area 22 is configured by, for example, the block group having a small size. With the configuration, even if the improper shutdown continuously occurs and necessity of cleanup is caused in the second writing area 22, the cleanup can be completed within the normal start processing time.

Further, as a result of the small size of the second writing area 22, the write operation to the second writing area 22 is restricted, for example, in the memory system 1 of the embodiment. With the restriction, it is possible to prevent the capacity of the second writing area 22 from becoming full until the cleanup is completed. Further, the memory system 1 of the embodiment transmits the completion notification to the host 2 with a delay of a predetermined time since start processing is completed, for example. With the delay, the time of the throughput restriction after completion of the start processing can be shortened. In this manner, the apparent length of the start processing time can be arbitrarily controlled by adjustment of the transmission timing of the completion notification of the start processing.

[Modification]

A plurality of the first writing areas may be provided. A plurality of the second writing areas may be provided.

A part of the first writing area may also serve as the second writing area. That is, the second writing area may be provided in the first writing area, and write may be performed in the second writing area even in normal operation. Even in this case, by configuring the second writing area to have a sufficiently small size, the cleanup can be quickly completed and the access command from the host can be processed even if another area (first writing area) is in cleanup after improper shutdown.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory having a first writing area and a second writing area; and
   a controller, wherein
   the controller is configured to:
   confirm whether processing of preserving data which has been written before shutdown which is not going through a predetermined shutdown procedure is being executed, in the nonvolatile memory, when the controller receives a write command;
   cause the nonvolatile memory to write data to the first writing area if the processing is not being executed; and
   cause the nonvolatile memory to write data to the second writing area if the processing is being executed,
   wherein a size of the second writing area is smaller than a size of the first writing area.

2. The memory system according to claim wherein the second writing area has a size in which the process of preserving data to write data to the second writing area is able to end before the process of preserving data to write data to the first writing area ends.

3. The memory system according to claim 2, wherein the controller is configured to
   cause the nonvolatile memory to write data to the first writing area or to the second writing area in a case where the processing is not being executed when the controller receives the write command.

4. The memory system according to claim 2, wherein the controller is configured to
   restrict throughput in a write operation of the nonvolatile memory when the processing is being performed.

5. The memory system according to claim 4, wherein the controller is configured to
   transmit completion notification of start processing to a host after elapse of a predetermined time since start processing is completed by the nonvolatile memory.

6. The memory system according to claim 5, wherein the predetermined time is set according to the size of the second writing area.

7. The memory system according to claim 5, wherein the smaller the size of the second writing area, the shorter the predetermined time is set to be.

8. The memory system according to claim 1, wherein the second writing area includes a cell capable of storing multivalued data, and
   the cell is used as a pseudo single-level cell.

9. A method of controlling a memory system, the method comprising:
   confirming whether processing of preserving data which has been written before shutdown which is not going through a predetermined shutdown procedure is being executed, in a nonvolatile memory, when receiving a write command;
   causing the nonvolatile memory to write data to a first writing area included in the nonvolatile memory if the processing is not being executed; and
   causing the nonvolatile memory to write data to a second writing area included in the nonvolatile memory if the processing is being executed,
   wherein a size of the second writing area is smaller than a size of the first writing area.

10. The method of controlling a memory system according to claim 9, wherein
    the second writing area has a size in which the process of preserving data to write data to the second writing area is able to end before the process of preserving data to write data to the first writing area ends.

11. The method of controlling a memory system according to claim 10, the method comprising:
    causing the nonvolatile memory to write data to the first writing area or to the second writing area in a case where the processing is not being executed when receiving the write command.

12. The method of controlling a memory system according to claim 10, the method comprising:
    restricting throughput in a write operation of the nonvolatile memory when performing the processing.

13. The method of controlling a memory system according to claim 12, the method comprising:
    transmitting completion notification of start processing to a host after elapse of a predetermined time after completion of the start processing by the nonvolatile memory.

14. The method of controlling a memory system according to claim 13, wherein
    the predetermined time is set according to the size of the second writing area.

15. The method of controlling a memory system according to claim 13, wherein the smaller the size of the second writing area, the shorter the predetermined time is set to be.

16. The method of controlling a memory system according to claim 9, wherein
    the second writing area includes a cell capable of storing multivalued data, and
    the cell is used as a pseudo single-level cell.

* * * * *

UNITED STATES PATENT AND TRADEMARK OFFICE
CERTIFICATE OF CORRECTION

PATENT NO. : 10,802,917 B2  
APPLICATION NO. : 16/129315  
DATED : October 13, 2020  
INVENTOR(S) : Ryuji Nishikubo et al.

Page 1 of 1

It is certified that error appears in the above-identified patent and that said Letters Patent is hereby corrected as shown below:

On the Title Page

Item (54) and in the Specification, Column 1, Lines 1-4, the Title of the Invention should read:
--MEMORY SYSTEM AND METHOD OF CONTROLLING MEMORY SYSTEM CONFIRMING WHETHER PROCESSING OF PRESERVING DATA WHICH HAS BEEN BEFORE SHUTDOWN--

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*